G. E. KIDD.
BRAKE ACTUATING MECHANISM FOR VEHICLES.
APPLICATION FILED AUG. 14, 1908.
925,195.
Patented June 15, 1909.
2 SHEETS—SHEET 1.
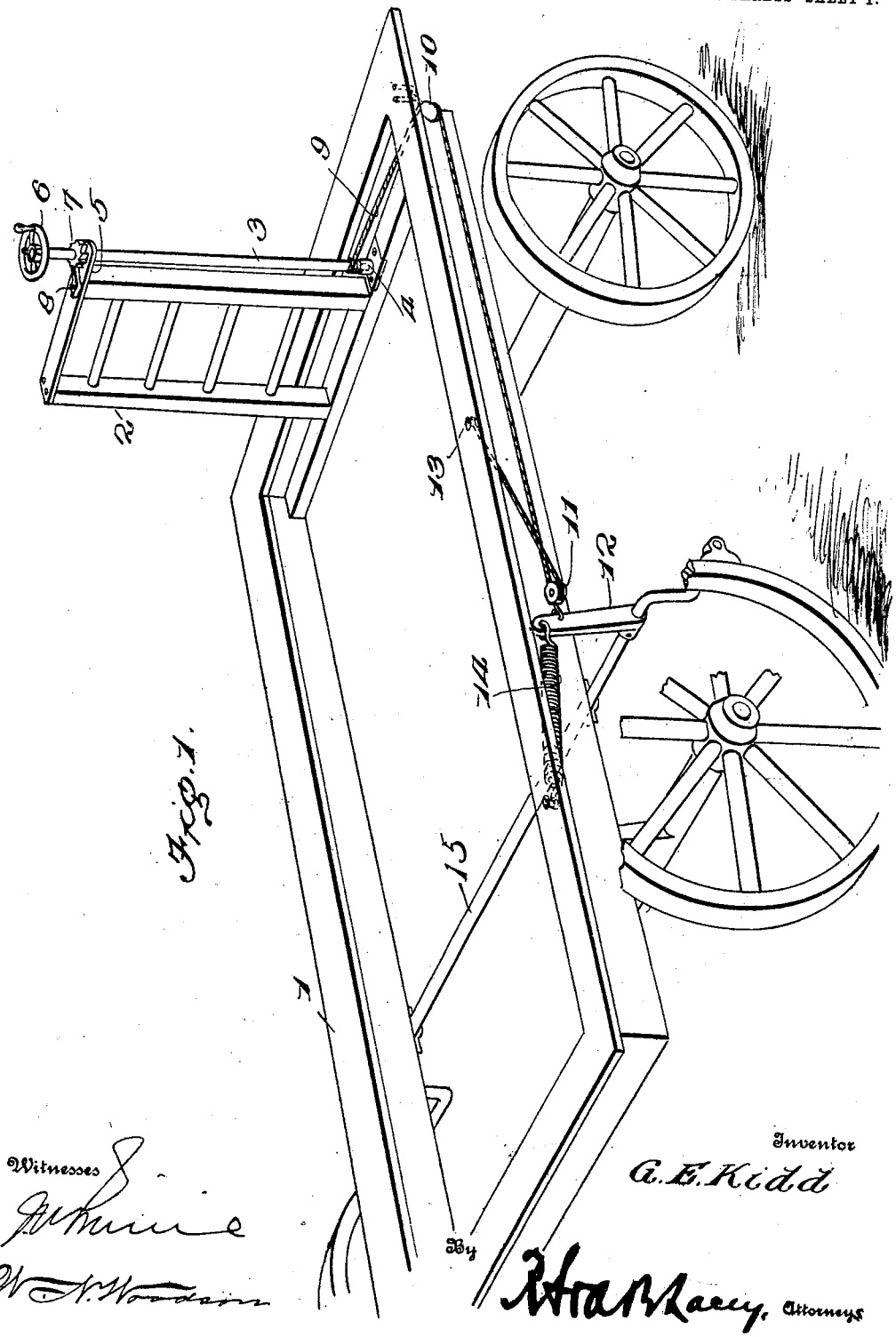

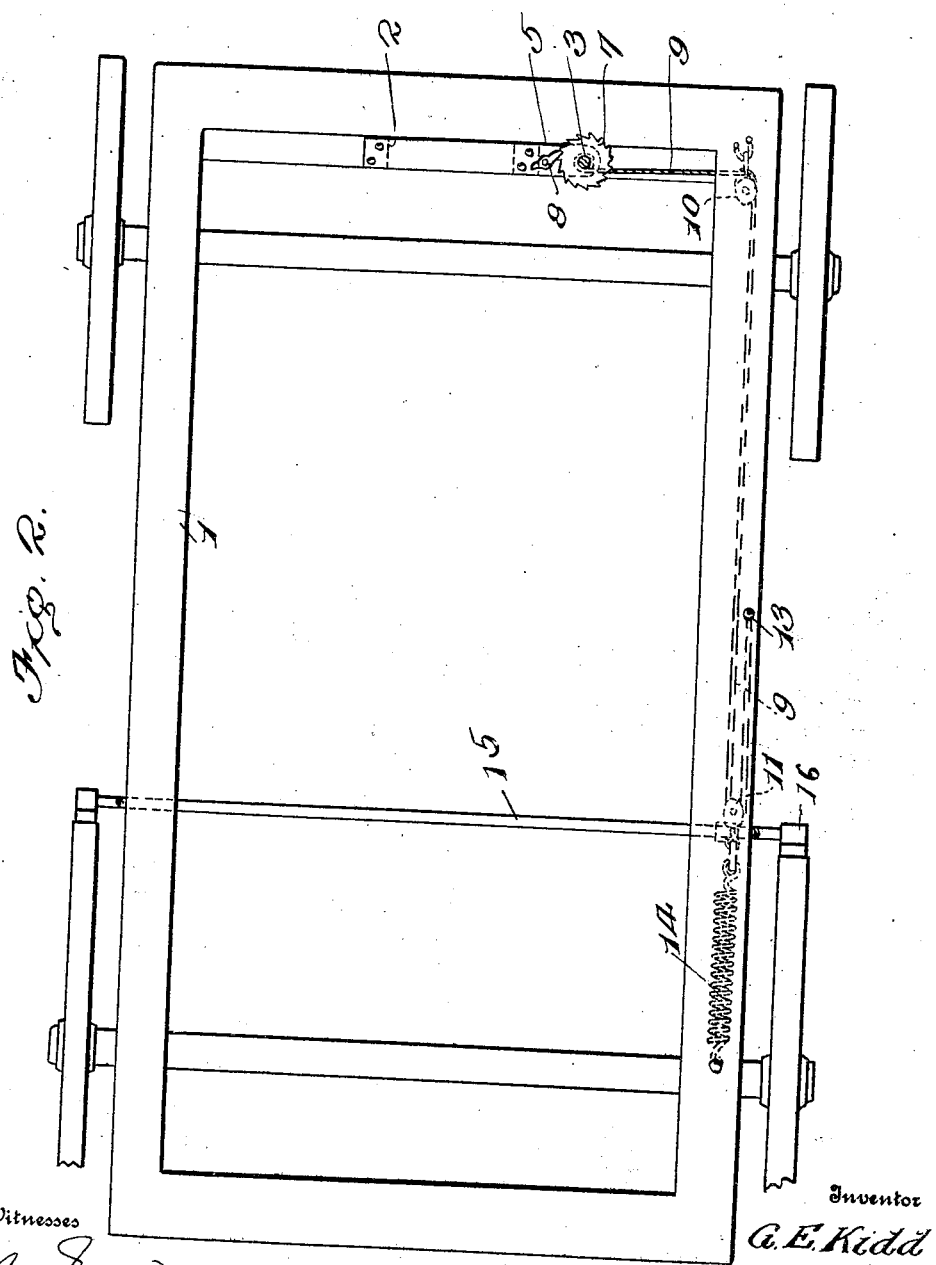

UNITED STATES PATENT OFFICE.

GEORGE E. KIDD, OF BLOOMFIELD, INDIANA, ASSIGNOR, BY DIRECT AND MESNE ASSIGNMENTS, TO THE HAY LADDER LOCK COMPANY, OF BLOOMFIELD, INDIANA.

BRAKE-ACTUATING MECHANISM FOR VEHICLES.

No. 925,195.  Specification of Letters Patent.  Patented June 15, 1909.

Application filed August 14, 1908. Serial No. 448,589.

*To all whom it may concern:*

Be it known that I, GEORGE E. KIDD, citizen of the United States, residing at Bloomfield, in the county of Greene and State of Indiana, have invented certain new and useful Improvements in Brake-Actuating Mechanism for Vehicles, of which the following is a specification.

The present invention relates in general to vehicles and more particularly to a novel brake actuating mechanism for hay wagons, the said brake actuating mechanism embodying a novel construction which admits of the wagon being readily locked or unlocked from the top of a load of hay or similar material.

The invention further contemplates a device of this character which is strong and durable in its construction and which can be easily operated to apply or release the brakes.

For a full understanding of the invention and the merits thereof and also to acquire a knowledge of the details of construction and the means for effecting the result, reference is to be had to the following description and accompanying drawings, in which:

Figure 1 is a perspective view of a hay wagon having the improved brake actuating mechanism mounted thereon, Fig. 2 is a top plan view of the same, the crank handle being removed from the upper end of the vertical shaft.

Corresponding and like parts are referred to in the following description and indicated in all the views of the drawings by the same reference characters.

Specifically describing the present embodiment of the invention, the numeral 1 designates the body portion of a hay wagon and 2 a frame projecting upwardly from the forward end of the body portion, the said body portion being mounted upon running gear in the usual manner.

A vertical shaft 3 is mounted upon one side of the frame 2, the lower end of the shaft being journaled in a bearing 4 upon the body portion 1 while the upper end of the shaft is journaled in an arm 5 projecting from one side of the frame 2. It will be observed however that the shaft projects upwardly above the frame and is provided at its upper extremity with a crank wheel 6 by means of which it can be readily rotated to apply or release the brakes as will be hereinafter set forth. Applied to the shaft 3 immediately above the arm 5, is a ratchet wheel 7 which is designed to engage a pawl 8 upon the frame 2 to prevent backward movement of the shaft after it has been turned to apply the brake. Secured to the lower end of the shaft so as to be wound thereon, is a cable 9 which passes around a pulley 10 at one of the forward corners of the body portion and then extends rearwardly along one side of the body portion 1.

The rear end of the cable 9 passes around a pulley 11 connected to an arm 12 projecting upwardly from a rock shaft 15 journaled upon the body portion of the vehicle, the extremity of the cable being secured to a staple 13. The extremities of the rock shaft 15 are bent to form crank arms which carry brake shoes 16 and when the arm 12 is drawn forward the rock shaft 15 is moved and the shoes 16 thrown into engagement with the rear wheels of the vehicle. A spring 14 is connected to the arm 12 and normally holds the brake in an inoperative position. However, when the shaft 3 is turned to take up the cable 9 the rock shaft is turned against the action of the spring and the shoes thrown into an operative position, backward turning of the shaft being prevented by causing the pawl 8 to engage the ratchet wheel 7. When it is desired to release the brake and unlock the wagon, the pawl 8 is disengaged from the ratchet wheel 7 and the spring 14 permitted to draw the brake bar 12 back into its original position, the cable 9 being unwound from the vertical shaft. With this construction it will be readily apparent that the brake can be easily and quickly manipulated from the top of a load of hay or like material without the necessity of stopping the wagon.

Having thus described the invention, what is claimed as new is:

The herein described brake adapted to be employed in connection with vehicles formed with a body portion and a vertical frame at one end of the body portion, the said brake comprising a vertical shaft journaled upon one side of the vertical frame of the vehicle, a ratchet wheel at the upper end of the vertical shaft, a pawl for coöperation with the ratchet wheel to prevent backward turning of the shaft, a rock shaft journaled upon the body portion of the vehicle and provided at its ends with crank arms, brake shoes carried by the crank arms, an arm projecting from the rock shaft, a spring connected to the arm and normally holding the brake shoes in an inoperative position, a pulley applied to the said arm, a second pulley applied to one of the corners of the body portion of the vehicle, and a cable adapted to be wound upon the vertical shaft and passing around the pulley upon the body portion of the vehicle and also around the pulley upon the arm of the rock shaft, the extremity of the cable being secured to the body portion of the vehicle.

In testimony whereof I affix my signature in presence of two witnesses.

GEORGE E. KIDD. [L. S.]

Witnesses:
   WILLIAM L. CAVIUS,
   DANIEL M. BYNUM.